G. B. SISSON.
SHAFT-BEARINGS.
No. 183,870. Patented Oct. 31, 1876.
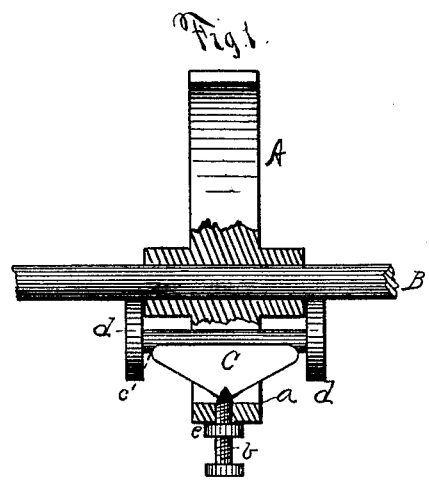
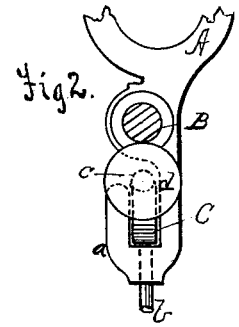
Witnesses:
T. H. Parsons.
J. R. Drake.
Geo. B. Sisson.
Inventor,
By his attorney
J. R. Drake.

UNITED STATES PATENT OFFICE.

GEORGE B. SISSON, OF BUFFALO, NEW YORK.

IMPROVEMENT IN SHAFT-BEARINGS.

Specification forming part of Letters Patent No. 183,870, dated October 31, 1876; application filed February 25, 1876.

*To all whom it may concern:*

Be it known that I, GEORGE B. SISSON, of Buffalo, in the county of Erie and State of New York, have made certain Improvements in Shaft-Bearings, of which the following is a specification:

This invention relates to bearings for large shafts used in factories, machine-shops, and other places; and the invention consists in the employment of an equilibrium-cradle with axle or axles running thereon, and having wheels which come in contact with the shaft, which takes off the load from the bearings, all as hereinafter described.

In the drawings, Figure 1 represents a front elevation, partly in section, showing a shaft in a hanger with the attachment of my device; Fig. 2, a side elevation of the same.

A represents the frame, or hanger, or bearing for the shaft B, which may be set at any angle from the shafting, or be attached to the ceiling, or fastened to the floor, as in Fig. 3, for ground shafting. In a gib-hook, $a$, which forms a part of the bearing, or may be fastened thereto, is set a metal cradle, C, the upper surface or edge grooved out (see Fig. 2, dotted lines) and chilled, the lower part coming nearly to a point, and resting on a pivot, pin, or screw, $b$, which regulates or adjusts the cradle. A jam-nut, $e$, will keep the screw or pivot in place. By the adjustment of this the bearing in the box by the cradle may be indefinitely reduced. Running in this groove is an axle, $c$, with wheels $d\ d$ at each end, which work against the shaft B, and receive motion from its revolutions, at the same time taking off the load or friction on the bearing A to a great extent. This cradle C, resting on the pivot $b$, has sufficient play to overcome or accommodate itself to any irregularity in the motion or inequalities in the shaft. This gib-hook $a$ can be attached to any hanger or journal-box, and at any angle in the longitudinal plane desired, to bring the wheels in contact with the shaft to relieve the load.

It will be seen that the use of my devices will obviate the hard turning of shafts, especially where a number of them are used, as a great deal of friction will be taken off of the boxes or bearings.

Another advantage to be derived from their use is, that the spent oil from the boxes will drop onto the axle $c$ and lubricate it as it turns in the groove of the equalized cradle, the truck-frame having suitable grooves, in which the axles $c'\ c'$ work. This double axle and truck would, probably, be best for very heavy shafts; but ordinarily the single one will be sufficient.

By these devices above described, I believe there can be saved at least one-third the power that is now wasted by friction on high-speed and hard-worked journals.

The single truck or cradle will resist the gravity of heavy loads, or the angular stress of belts, in any direction it may be placed.

I claim—

1. The double or single equilibrium-cradle C, with the axle or axles $c$ working therein in a chilled groove, the wheels $d\ d$ of the axle or axles $c$ brought into contact with the shaft B, and regulated by the adjustable pivot or screw $b$, substantially as and for the purpose specified.

2. The gib-hook $a$, in combination with the bearing A, cradle C, axle and wheels $c\ d\ d$, and set at any point or angle thereto, substantially as and for the purpose specified.

In witness whereof I have hereunto signed my name in the presence of two subscribing witnesses.

GEORGE B. SISSON.

Witnesses:
J. R. DRAKE,
T. H. PARSONS.